May 26, 1964  A. L. NIELSEN  3,134,333
SUBMERSIBLE MOTOR SUMP PUMP
Filed Dec. 3, 1962  2 Sheets-Sheet 1
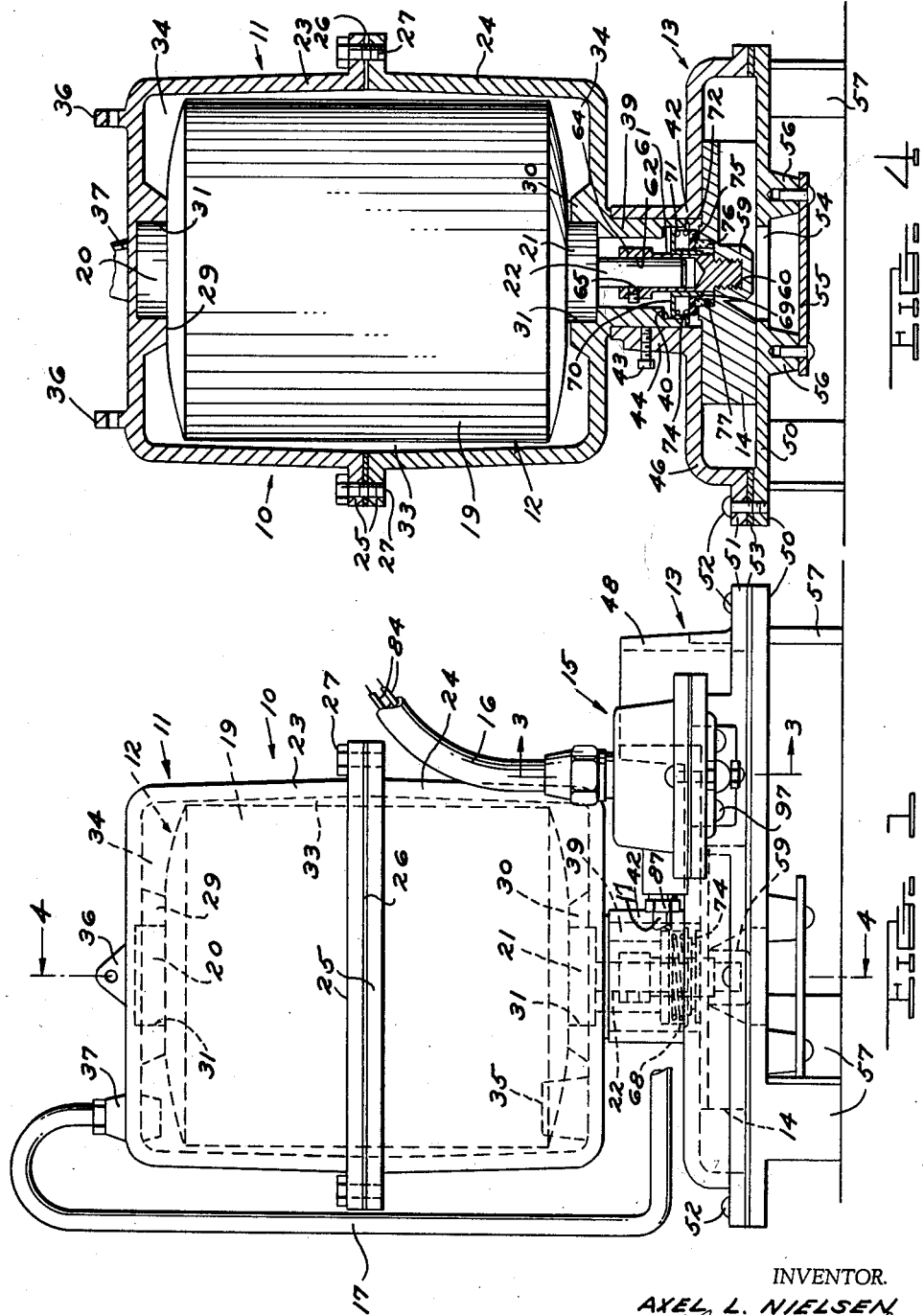
INVENTOR.
AXEL L. NIELSEN
BY
ATTORNEYS May 26, 1964
A. L. NIELSEN
3,134,333
SUBMERSIBLE MOTOR SUMP PUMP
Filed Dec. 3, 1962
2 Sheets-Sheet 2
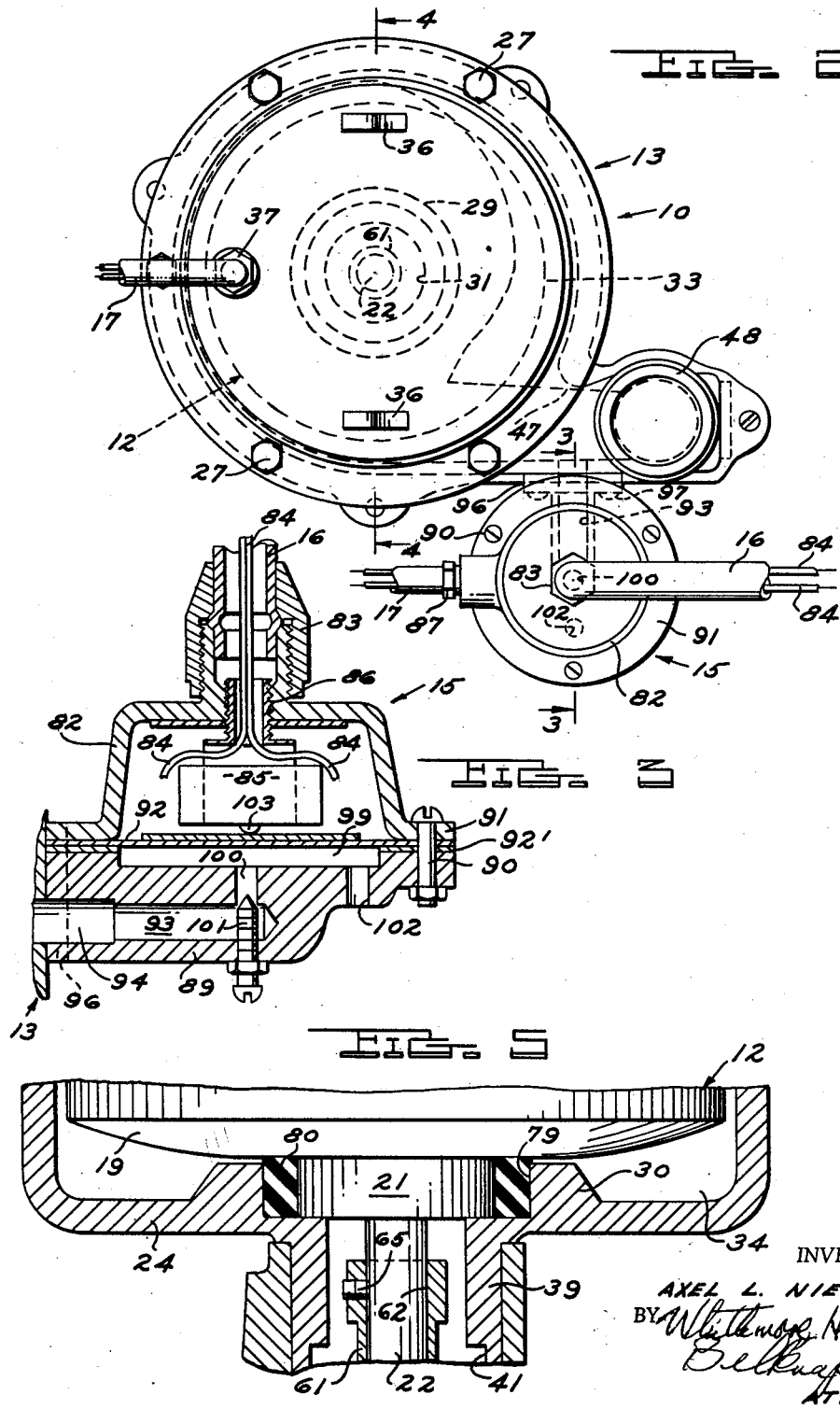
INVENTOR.
AXEL L. NIELSEN
BY
ATTORNEYS United States Patent Office 3,134,333
Patented May 26, 1964

3,134,333
SUBMERSIBLE MOTOR SUMP PUMP
Axel L. Nielsen, 1316 E. Elza, Hazel Park, Mich.
Filed Dec. 3, 1962, Ser. No. 241,574
4 Claims. (Cl. 103—87)

The present invention relates to improvements in a submersible motor type of sump pump, characterized by a watertight housing which mounts in a sealed condition therein an electrical motor adapted to be drivingly connected to a pump impeller. This impeller is encased in an impeller housing fixedly associated with the motor housing at the bottom end of the latter. More particularly, the invention relates to a housing and motor structure of this general type in which the motor is a standard one having extremely simple provisions for mounting its shell or casing in coaxial relation to the motor and impeller housings, without requiring the use of specially machined motor end frames and bearing assemblies such as make it extremely difficult and expensive to obtain proper repair or replacement service in the field.

Submersible type sump pumps have experienced a considerably increased sale and use in recent years, which would no doubt increase further save for the fact that all of them presently available involve the use of motor parts, such as stators and rotors, which must be fitted into specially machined end frames and bearing assemblies to mount such parts within a submersible sealing housing structure. Thus when the need for repair of servicing of the motor arises, it must be returned to the particular factory which made it, or in any event to an authorized and specially trained service station, for necessary replacement parts and/or repair.

It is therefore a general object of the invention to meet this drawback by providing a submersible motor housing structure for a sump pump which makes it possible to use an entirely standard and ordinary, general purpose motor as the impeller drive means. To this end, the improved motor housing receives and mounts the motor at only two places, i.e., at coaxial mounting bosses integrally formed internally of a pair of coacting housing sections or halves, which are bolted in sealed relation to one another with the motor installed therein at such bosses. Thus extensive machining and use of special motor mounting and adapter parts is eliminated.

Another object is to provide a motor and housing structure of this type in which, with the motor mounted to the housing bosses as described, there is an air space surrounding and at opposite ends of the standard motor housing or shell, between the latter and the motor mounting housing or casing. Thus air circulated in such space by the usual fan means of the motor will be cooled by external water in which the motor housing structure is immersed.

More specifically, the invention contemplates the provision of a motor mounting housing structure having coaxial motor locating bosses as described, in which said housing structure is coaxially and telescopingly applied, at an integral axial sleeve extension thereof, to and above an impeller housing. In such a combination contemplated by the invention, the impeller within the impeller housing is provided with a tubular upstanding driving adapter, the latter being preferably applied to the impeller from above and coaxially of the latter.

Thus, in accordance with the invention, when the need arises the entirely standard, conventionally cased motor can be easily and quickly removed from its drive connection to the impeller and from the motor housing structure, then repaired and replaced with equal ease and speed. In the alternative, a similar new motor may be taken from the shelf and easily and quickly mounted to the housing structure. The only requirement is that such replacement motor matches the machining of the bosses of the motor housing halves or sections which received and mounted the replaced motor. Thus, in the usual case, the replacing and replaced motors should be of the same standard N.E.M.A. design, at least in respect to parts thereof which are mounted to the bosses.

It is a further object of the invention to provide the combination of a two-part housing structure as described, and a standard motor having its casing housed within such structure, in watertight sealed relation to the latter.

A still further object is to provide such a combination of motor and housing structure, as associated with an impeller housing and impeller structure, as well as a diaphragm device responsive to both hydrostatic pressure in which the unit is immersed and to hydrodynamic discharge pressure in the impeller housing, with a switch operated by the pressure responsive diaphragm member electrically connected through liquid tight connections to the motor and to a source of electrical power.

Another and still more specific object is to provide a combination as described in the preceding paragraph, in which hydrodynamic pressure is communicated from the impeller housing to the pressure responsive unit through an adjustable needle valve centered relative to the diaphragm, so that the latter may maintain the switch closed under direct hydraulic jet action of variable force, once operation of the sump pump impeller is commenced.

The foregoing as well as other objects will become more apparent as this description proceeds, especially when considered in connection with the accompanying drawings illustrating the invention, wherein:

FIG. 1 is a side elevational view showing the improved submersible motor sump pump of the invention, including motor housing structure in which a standard motor is shown in dot-dash line, an impeller housing and pressure sensitive electrical control means associated with such housing structure;

FIG. 2 is a top plan view of the sump pump of FIG. 1, electrical connections being broken away;

FIG. 3 is a fragmentary view in vertical section along line 3—3 of FIGS. 1 and 2;

FIG. 4 is a view in vertical section along line 4—4 of FIGS. 1 and 2, showing the motor as being mounted directly and rigidly to the housing structure at axially opposed bosses of the latter; and FIG. 5 is a fragmentary view in section generally similar to FIG. 4, showing the use of a resiliently cushioned mount for the motor at the bosses referred to above.

In general, the submersible motor sump pump 10 of the invention is comprised of an assembly of a motor housing structure, generally designated 11, having a motor 12 mounted therein in a manner to be described; an impeller housing 13 mounted to the housing structure 11 as will be described and having a centrifugal type impeller 14 therein; and a hydrostatically and hydrodynamically responsive, diaphragm-controlled switch unit 15 fixedly associated with impeller housing 13, electrical energy being supplied to the switch unit 15 through a liquid tight cable 16 which is open to the atmosphere above the water level, and being transmitted to the motor 12 in housing structure 11 through an electrical cable 17.

It is to be assumed that the motor 12 is a standard and readily available type suitably rated to drive pump impeller 14 for desired pumping capacity, for example a General Electric ¼ horsepower, 48 frame motor (N.E.M.A. rating), characterized by the usual shell, casing or housing 19 equipped at axially opposite shaft ends with bearing bosses 20, 21 or the like, from one of which the drive shaft 22 of the motor extends.

For a design of the sump pump 10 to accommodate such a motor, the housing structure 11 will comprise, as best shown in FIG. 4, a pair of bell-shaped, upper and lower housing parts 23, 24, respectively, both provided with a laterally outwardly projecting peripheral flange 25 surrounding the open mouth thereof. The axially facing surface of each flange 25 is machined for a liquid tight sealing engagement with an appropriate sealing gasket 26 when the housing parts 23, 24 are assembled in face-to-face engagement at their flanges, with gasket 26 interposed. They are held tightly in an externally sealed, liquid tight relation by a series of bolts 27 applied through the flanges.

In accordance with the invention, the respective housing parts 23, 24 are provided with internal, axially facing bosses 29, 30, which are each provided with a cylindrical recess 31 accurately machined on its axially extending surface for a relatively close tolerance reception of the respective boss formations 20, 21 of motor 12, the bottom boss 21 directly engaging the bottom of the recess and being centered by the wall of the latter. The internal diameter of the housing parts 23 is such as to leave an annular clearance space 33 between the same and the motor shell 19, as well as a substantial space 34 at either axial end of the motor. Thus, the usual fan of the motor may circulate substantially cooling air in these spaces, which air is maintained cool by the water on the outside of housing structure 11 in which the sump pump is immersed. General purpose motors of the type instanced above are specified as needing no lubrication for from three to ten years, depending upon whether the motor is a sleeve or ball bearing type; so that lubrication of motor 12 presents no problem over a lengthy period of use.

One or more upright lugs 35 may be formed on either the upper or lower housing part 23 or 24, or both, for engagement with the shell of motor 12 to hold the latter against rotation.

The upper motor housing part 23 is provided at its top with a pair of integral, diametrically opposed and upwardly extending ears 36 which are drilled for the reception of an appropriate carrying handle. A fitting 37 is also provided through which the watertight electrical cable or conduit 17 is brought into the interior of housing structure 11, there to be wired to motor 12 in a known manner. Of course, all connections are such as to prevent exposure of electrical connections or the interior of housing structure 11 to water in which the pump 10 is immersed.

The lower motor housing part 24 is provided, in axial alignment with its motor mounting boss 30, with an axially downwardly projecting tubular extension or sleeve 39, through which the motor shaft 22 centrally projects. This extension is cylindrically counterbored and machined at 40 to provide a finished axially extending surface for a purpose to be described.

The impeller housing 13 is formed to provide a central, axially extending upward sleeve extension 42, within which the tubular extension 39 of the housing structure 11 is telescopingly received with slight radial tolerance; and a set screw 43 is threaded into a thickened boss 44 of impeller housing sleeve 42 for the purpose of holding the housing structure 11 and impeller housing 13 in fixed assembled relation to one another.

As indicated in FIGS. 1 and 2, the impeller housing is a volute type having a downwardly facing bell-shaped part 46 provided with a tangential discharge passage 47 (FIG. 2) communicating in a known manner with the interior thereof, this passage discharging upwardly through an integral tubular fitting 48 of suitable flow handling capacity, thence through a hose or like connector (not shown) to a suitable place. The impeller housing 13 is completed by a bottom plate 50 secured about its perimeter to a radial flange 51 of housing part 46, as by a series of bolts 52 with a suitable annular sealing washer or gasket 53 interposed. Bottom plate 50 has a circular intake opening 54 at the eye of impeller 14; and a circular trap plate 55 is bolted to downwardly projecting posts 56 integral with impeller housing bottom plate 50, entry of water to the intake opening 54 being in the space between such posts. The impeller housing 13 and the housing structure 11 and motor 12, the latter supported in the manner described above, are supported on the bottom of the sump by a series of downwardly projecting floor legs 57 on bottom plate 50.

Referring to FIG. 4, the impeller 14 is shown as being provided at its axial center with an integral, downwardly projecting cup formation 59 which is centrally threaded from above at 60 to receive a special tubular shaft adapter 61. This adapter has an upwardly opening bore 62 adapted to receive, with a relatively close tolerance, the downwardly projecting shaft 22 of motor 12, the adapter 61 and shaft 22 extending from opposite directions into the tubular extension 39 of housing structure 11, and the sleeve formation 42 of impeller housing 13 being telescopingly engaged with extension 39 in this zone.

In accordance with the invention, the adapter 61 is formed to provide a diametrically thickened upper portion 64 through which a set screw 65 is threaded to engage and drivingly connect the motor shaft 22 with the adapter 61, hence with the impeller 14 to which the adapter is drivingly connected at the threads 60.

For the purpose of sealing against entry of water to the interior of housing structure 11, a spring-piloting and retainer stamping 68 of sheet metal is provided, being of an annular outline characterized by a tubular, axially downwardly extending wall or flange 69 surrounding the adapter 61, a radially extending annular wall 70 outwardly of flange 69, and an axially extending, annular outer wall 71. The last named wall has a tight telescoping fit within the machined axial wall of the counterbored housing extension 39, and it is radially outwardly flanged at 72 for upward restraining action against the bottom of housing sleeve extension 39, outwardly of the counterbore 40 of the latter.

A coil compression spring 74 is piloted within the stamping 70, bearing downwardly against the upper surface of a suitable annular sealing washer or gasket 75. This gasket has a tight seal with the axial flange 69 of the retainer stamping 68, and bears downwardly against a rigid annular sealing ring 76 fitted in a top counterbore 77 of impeller 14. The ring 76 may be of a suitable ceramic or other bearing and sealing material, and is cemented in the counterbore 77 to rotate with the impeller, thus affording a liquid tight seal against entry of liquid from impeller housing 13 to the motor housing structure 11 in the zone of the shaft-to-impeller driving connection.

FIG. 4 of the drawings shows the motor 12 as having its bottom boss formation 21 received directly in the bore 31 of the bottom housing part boss 30, in direct metal-to-metal engagement of the respective surfaces in this zone. The same is true of the reception of the integral top motor boss 20 in the top housing recess 31. FIG. 5 discloses an alternative optional arrangement, in which the corresponding boss bore, here designated 79, is of larger diameter to receive an annular resilient cushion ring 80, within which the bottom boss 21 of the motor extends, and upon which the latter rests for a cushioned resilient support. In this case, the need for expensive machining of the cylindrical surface of bore 79 is eliminated, the ring 80 snugly fitting the motor boss 21. In other respects, features of the housing and impeller driving provisions are the same as described above, hence designated by corresponding reference numerals.

The hydrostatically and hydrodynamically responsive switch control unit 15 is of the type illustrated and described in my Letters Patent No. 3,067,302 of December 4, 1962, specific details thereof therefore not being involved in the present invention. As best shown in FIG. 3 (reference also being had to FIGS. 1 and 2), the unit 15 comprises a control housing made up of an upper inverted bell-shaped housing part 82, to the interior of which the electrical liquid tight supply cable 16 is communicated through a watertight connection 83 of the top of part 82. The leads 84 of this cable extend into the interior of housing part 82, where they are electrically connected suitably to a normally open switch 85 held in vertically adjustable relation to housing part 82 by means of a threaded fitting 86 on a mount for the switch. The electrical cable 17 from unit 15 to the motor housing structure 11 exits from housing part 82 through a sealed fitting 87 (FIGS. 1 and 2) in the side wall of that part.

The pressure responsive control unit 15 is completed by a bottom housing part 89 clamped by a series of screws 90 to a bottom flange 91 of the upper part 82, a flexible diaphragm 92 and an annular sealing washer 92' being interposed. Bottom housing part 89 is provided with a radially extending liquid flow passage 93 which is placed in communication at 94 with the discharge passage 47 of impeller housing 13. Switch control unit 15 is mounted to the side of the upper impeller housing part 46 through a pad and gasket unit 96, using a series of fastening screws 97.

The passage 93 of control housing part 89 communicates with the space 99 beneath diaphragm 92 through a passage 100 located beneath the center of the diaphragm; and the effective width of this passage 100 is adjustably regulated by means of a needle valve member 101 threaded upwardly into housing part 89. The bottom housing part 89 is also provided with a hydrostatic pressure entry opening 102 to the space 99, this opening also voiding liquid admitted to space 99 under discharge pressure in passage 93. The principles of operation of the switch control structure 15 are explained in detail in my copending application referred to above, and need no further enlargement here. It suffices to say that, upon placing of the pump 10 in a sump, hydrostatic pressure at a predetermined liquid level in the latter, as determined by the adjustment of switch 85 in unit 15, will occasion a pressure in space 99 sufficient to cause diaphragm 92 to close the normally open switch 85 by engaging its control button 103. Thereafter, continuing jet action of discharge water in passage 93 through the passage 100 (as controlled by needle valve 101) will cause the diaphragm to maintain the switch closed until the desired pumping out of the sump is effected.

It is to be seen from the above that the invention affords an extremely simple and inexpensive motor housing structure for a submersible sump or like pump, and one enabling the use of an entirely standard and widely available type of electrical motor, thus avoiding the need for extensive and expensive machining and motor mounting parts. Disassembly of the motor and housing for motor repair, servicing or replacement is a very simple matter; and it will be appreciated that the arrangement is one which also avoids the need and expense of special bearing provisions, those built into the motor sufficing for the impeller 14, as the latter is secured by impeller adapter 61 on motor shaft 22.

What I claim as my invention is:

1. In a sump or like pump adapted to be immersed in a liquid to be pumped, the combination of a motor and an externally sealed housing structure encasing said motor, said motor having a casing in which its shaft is mounted for rotation, said casing having integral external, axially projecting and aligned formations at the axial ends thereof, through one of which formations the shaft extends, said housing structure comprising at least two housing parts in fixed and externally sealed relation to one another to provide a sealed interior housing space in which said motor casing is disposed, said housing parts each being provided with an integral recess formation directly surrounding and engaging one of the respective motor casing formations to constitute with the latter the sole means for mounting said motor in said housing structure, said motor casing and said housing structure being relatively proportioned to provide air space therebetween at the sides thereof.

2. In a sump or like pump adapted to be immersed in a liquid to be pumped, the combination of a motor and an externally sealed housing structure encasing said motor, said motor having a casing in which its shaft is mounted for rotation, said casing having integral external, axially projecting and aligned formations at the axial ends thereof, through one of which formations the shaft extends, said housing structure comprising at least two housing parts in fixed and externally sealed relation to one another to provide a sealed interior housing space in which said motor casing is disposed, said housing parts each being provided with an integral recess formation directly surrounding and axially engaging one of the respective motor casing formations to constitute with the latter the sole means for mounting said motor in said housing structure, said motor casing and said housing structure being relatively proportioned to provide air space therebetween at the sides and axial ends thereof.

3. In a sump or like pump adapted to be immersed in a liquid to be pumped, the combination of a motor and an externally sealed housing structure encasing said motor, said motor having a casing in which its shaft is mounted for rotation, said casing having integral external, axially projecting and aligned formations at the axial ends thereof, through one of which formations the shaft extends, said housing structure comprising at least two housing parts in fixed and externally sealed relation to one another to provide a sealed interior housing space in which said motor casing is disposed, said housing parts each being provided with an integral recess formation directly surrounding and engaging one of the respective motor casing formations to constitute with the latter the sole means for mounting said motor in said housing structure, said motor casing and said housing structure being relatively proportioned to provide air space therebetween at the sides thereof, one of said housing parts having a tubular extension coaxial with said recess formation of said part which projects axially and through which the motor shaft extends, and a pump housing in axially telescoped engagement with said tubular extension and containing an impeller connected to said motor shaft.

4. In a sump or like pump adapted to be immersed in a liquid to be pumped, the combination of a motor and an externally sealed housing structure encasing said motor, said motor having a casing in which its shaft is mounted for rotation, said casing having integral external, axially projecting and aligned formations at the axial ends thereof, through one of which formations the shaft extends, said housing structure comprising at least two housing parts in fixed and externally sealed relation to one another to provide a sealed interior housing space in which said motor casing is disposed, said housing parts each being provided with an integral recess formation directly surrounding and engaging one of the respective motor casing formations to constitute with the latter the sole means for mounting said motor in said housing structure, said motor casing and said housing structure being relatviely proportioned to provide air space therebetween at the sides thereof, one of said housing parts having a tubular extension coaxial with said recess formation of said part which projects axially and through which the motor shaft extends, and a pump housing in axially telescoped engagement with said tubular extension and containing an impeller connected to said motor shaft, said impeller having shaft means fixedly connected thereto to drive the same, including a sleeve element projecting into said tubular extension and fixedly connected to the motor shaft.

References Cited in the file of this patent

UNITED STATES PATENTS

| | | |
|---|---|---|
| 2,079,909 | Jackson | May 11, 1937 |
| 2,627,816 | Kaatz et al. | Feb. 10, 1953 |
| 2,845,871 | Compton | Aug. 5, 1958 |
| 2,862,452 | Lung | Dec. 2, 1958 |
| 3,046,900 | Pollak | July 31, 1962 |